INVENTORS
EDWARD W. ATHERTON
STANLEY ZOCHOLL
BY
ATTORNEYS

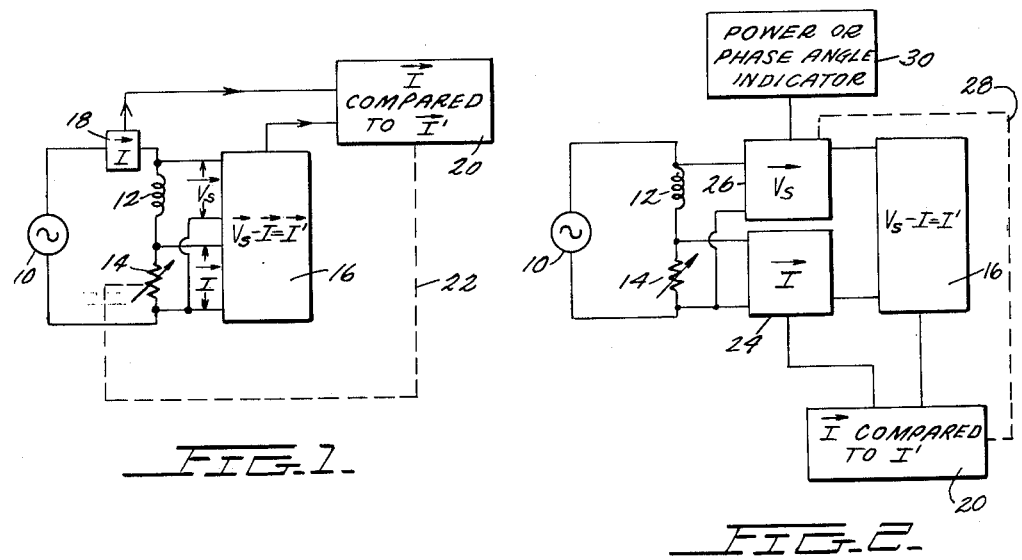
FIG. 1.
FIG. 2.
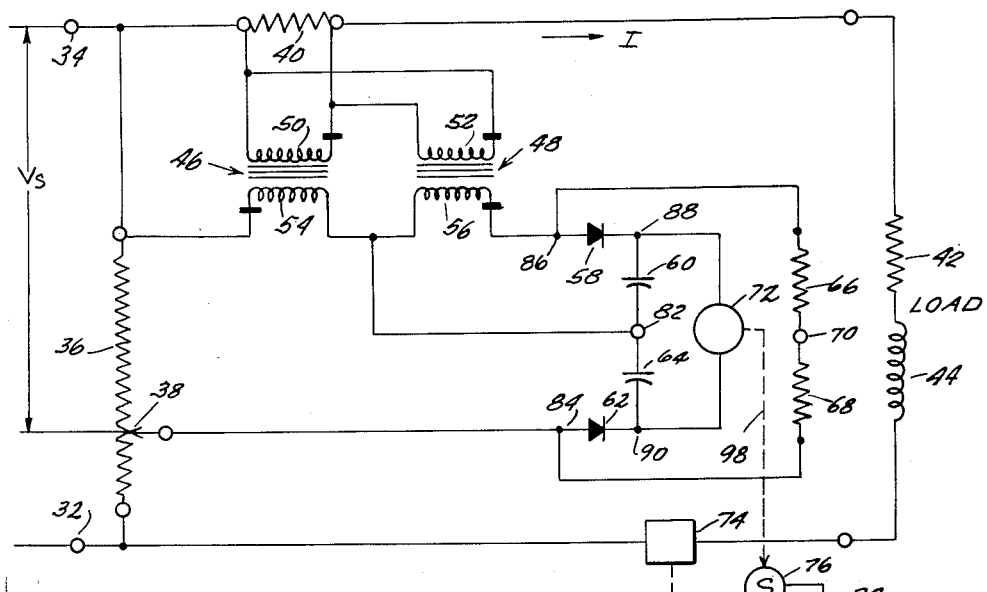
FIG. 4.
INVENTORS
EDWARD W. ATHERTON
STANLEY ZOCHOLL
BY
ATTORNEYS Aug. 21, 1962  E. W. ATHERTON ETAL  3,050,676
POWER COMPONENT DETECTOR Filed Dec. 23, 1957  2 Sheets-Sheet 2

3,050,676
POWER COMPONENT DETECTOR
Edward W. Atherton, Houston, Tex., and Stanley E. Zocholl, Philadelphia, Pa., assignors to I-T-E Circuit Breaker Company, Philadelphia, Pa., a corporation of Pennsylvania
Filed Dec. 23, 1957, Ser. No. 704,703
5 Claims. (Cl. 323—66)

Our invention relates to a novel power control means in which the output power or some power condition of a system may be measured or controlled to be maintained at some constant value.

As is well known, the electrical power of a circuit is computed from the magnitude of the voltage at any point mutiplied by the current flowing through this point and the cosine of the phase angle between the voltage and the current. It is old and well known to obtain an indication of this power in a watt meter by establishing a space and time relation of the fluxes caused by the voltage and the current, whereby the torque produced by the interaction of these fluxes will be a measure of the power of the system. However, mechanical structure is required in this type of structure which introduces relatively high costs of manufacture, maintenance problems and inherent inaccuracies.

Furthermore, if it is desired to maintain a constant output power in using the above type watt meter, transducer means for converting the mechanical torque into an electrical error signal for subsequently controlling a power control means must be added to the system. This additional component will introduce further difficulties related to accuracy and maintenance, as well as increasing the cost of the system.

The essence of our invention is to provide a novel power control means applicable to circuits having either a constant input voltage or constant input current in which the deviation of a power condition of the circuit power such as phase angle, or some function of phase angle from a predetermined amount is electrically indicated in the absence of any mechanical components in the measuring system.

Accordingly, our circuit may be used as a power measuring means by measuring the amount of correction required of an output error signal for returning the power to some predetermined amount. This measure may be calibrated on a metering device to yield the actual measured power.

In a similar manner, our novel circuit may be used to control the output power of the circuit by causing an error signal to be generated responsive to the deviation of the power from some predetermined value, and then causing this error signal to control a power controlling device for adjusting the power to bring the error signal to zero.

More specifically, when a circuit having a constant voltage output is utilized, our invention involves the measuring of the vector current of the circuit and the provision of a standard voltage which is proportional to twice the component of the measured vector current which is in phase with the system voltage. That is to say, the standard signal is equal in magnitude to twice the measured current magnitude times the cosine of the phase angle between the system voltage and current, this standard signal value being kept constant. Since the system voltage is assumed to be constant, it is clear that the standard voltage will also be constant if it is taken from the system voltage.

The current vector is then vectorially subtracted from the standard voltage signal to thereby yield a resultant vector quantity.

As will be clearly shown hereinafter, the new vector achieved by subtracting the vector current from the vector standard voltage will be equal in magnitude to the magnitude of the vector current only when the system current magnitude times the cosine of the phase angle is some constant value (which is one-half of the magnitude of the standard voltage signal). When the resultant measured vector is greater than the current vector, then the system current times the cosine of the phase angle will be shown to be less than this predetermined constant value, while the current times the cosine of the phase angle will be greater than some predetermined value in the event that the measured vector current is less than the system vector current.

From the above a difference signal, or error signal may be measured, which is the difference between the actual system current magnitude and the current magnitude of the resultant current, and this error signal may be used to return the value of the system current times the phase angle to some predetermined constant value and thereby keep the system power at the constant value.

In a similar manner, it is possible to cause our novel system to measure the actual power of the system where the error signal created by a difference in the resultant current vector and actual current vector is used to alter the magnitude of the voltage standard signal until the error signal is brought to zero. In this application, it is to be understood that the magnitude of the voltage standard signal is an indication of the output power of the system. Thus, when this is set to some predetermined value and must be increased in order to bring the error signal to zero, this increase is an indication of the power of the system above some predetermined value; and conversely, if it must be reduced, then it is an indication of the power of the system below this predetermined value.

From this power measurement, it is clear that the measuring device may be calibrated to include current or voltage measuring means whereby the resultant indication would be phase angle, or the voltage of the system or current of the system, or some function of the phase angle.

Accordingly, the primary object of our invention is to provide a novel power condition measuring means.

Another object of our invention is to provide a power condition measuring means which operates independently of mechanical measuring structure.

A further object of our invention is to provide a novel reliable and accurate power condition indicating device.

A further object of our invention is to provide a novel power condition control means for circuits having a constant voltage input or constant current input in which a standard voltage or current is set up and is compared to the resultant of the vector difference between the standard signal and the voltage or current signal to yield an error signal output which indicates the deviation of the system power condition from a predetermined power.

These and other objects of our invention will become apparent from the following description when taken in conjunction with the drawings, in which:

FIGURE 1 shows a partially schematic and partially block diagram of our novel invention as applied to a constant power output control means.

FIGURE 2 is similar to FIGURE 1 and shows our invention as applied to a power or phase angle measuring means.

FIGURE 4 shows a schematic diagram of a circuit constructed in accordance with our novel invention.

Figure 3A:
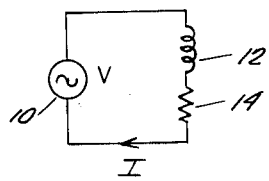
FIGURE 3a shows a simple circuit diagram for use in the explanation of the operation of our invention.
Figure 3B:
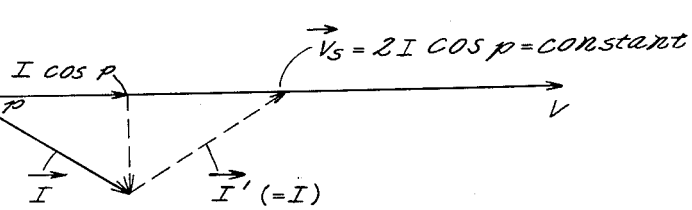
FIGURE 3b shows a vector diagram of one voltage and current condition for FIGURE 3a in which the output power of the system of FIGURE 3a is at some predetermined value.
Figure 3C:
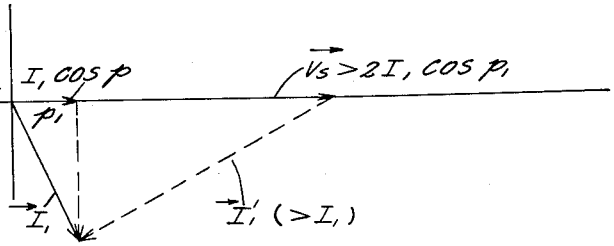
FIGURE 3c shows a vector diagram of FIGURE 3a in which the output power of the system differs from some constant value in a first manner.
Figure 3D:
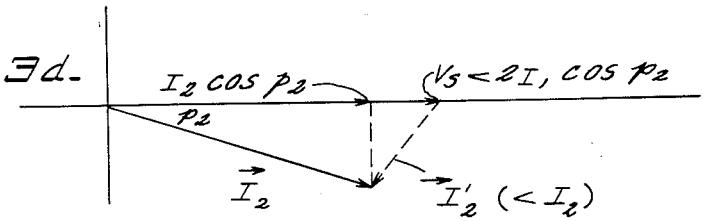
FIGURE 3d shows a vector diagram of FIGURE 3a in which the output power of the system differs from a predetermined value in a second manner.

Referring first to FIGURES 3a through 3d, the theory of operation of our novel invention may be understood from a consideration of the circuit of FIGURE 3a which includes a voltage source 10 connected across an inductive load, which includes the inductor 12 and resistor 14, in conjunction with the various vector diagrams of FIGURES 3b, 3c and 3d showing the relationship of the voltage V of source 10 and the current I of the circuit.

As is shown in FIGURE 3b, the voltage V is plotted along the ordinate and the vector current I lags the voltage V by the phase angle $p$ when voltage V is represented by a counterclockwise rotating vector.

In accordance with our invention, and as is shown in FIGURE 1, a standard voltage signal $V_s$ is taken from the voltage V. In the embodiments to be described hereinafter, it will be assumed that the system input voltage is constant and the operation of the systems for a constant current input will be obvious to those skilled in the art.

The voltage $V_s$ is shown in FIGURE 3b as being equal to twice the current I times the cosine of the phase angle $p$. This setting will give some desired output power in the circuit of FIGURE 1, it being desired that this power is maintained constant.

Accordingly, since the input voltage is constant, it is only necessary to ensure that the value $I \cos p$ is maintained constant to achieve a constant output power. Thus, it is immaterial whether the current I is very large and the cos $p$ small, or vice versa so long as the quantity $I \cos p$ is constant.

The magnitude of the output power is adjusted by adjusting the constant value to which $I \cos p$ is to equal, for if this constant value is set to be larger, then the power output of the system will be larger and vice versa.

We have found that once the value $I \cos p$ is determined, and the voltage signal $V_s$ is adjusted to twice this value, by vectorially subtracting the value $V_s$ from the current I in FIGURE 3b a vector quantity I' (shown in dotted lines) will be yielded. Furthermore, the magnitude of vector I and vector I' will be equal to one another only when the value $2I \cos p$ is equal to the preselected standard voltage $V_s$. That is to say, when this condition obtains, the in-phase component of vectors I and I' will be equal in magnitude to one another and to the value $I \cos p$, as indicated in FIGURE 3b.

Assume now that the values I and $p$ change to the values $I_1$ and $p_1$ so that the quantity $2I_1 \cos p_1$ is less than the standard voltage signal $V_s$. As clearly set forth in FIGURE 3c, the vector $I_1'$ obtained by subtracting the vector $I_1$ from vector $V_s$ will be substantially larger in magnitude than is the vector $I_1$. In a similar manner, if the current I and angle $p$ increase to values $I_2$ and $p_2$, as in FIGURE 3d, it is seen that the magnitude of resultant current vector $I_2'$ will be substantially smaller than the magnitude of current $I_2$.

Referring now to FIGURE 1 which shows the circuit of FIGURE 3a as further including means for obtaining a preselected value of a voltage standard $V_s$ and the value of current I (using resistor 14 which is now shown as adjustable and used as a shunt), the vector quantities $V_s$ and I are subtracted as described above by circuit means shown schematically as block 16 to yield some value of current I'.

The signal I' and a signal proportional to the system current I taken from current measuring means 18 (which could also be a shunt device, such as adjustable resistor 14, or could be the adjustable resistor 14 itself) are delivered to a comparator device 20 which compares the I and I' signal. Device 20 may be of any well known type which can deliver a D.-C. error signal from a comparison of signals I and I' which has a polarity given by the direction of difference between the signals and a magnitude given by the excursion between the signals. This error signal may then be utilized to actuate a feedback type of system schematically indicated by dotted line 22 which controls the power of the circuit, as by controlling rheostat 14. Clearly, however, the error signal could be utilized to adjust any kind of power controlling means through any type of servo system.

In operation, if the circuit conditions of the circuit of FIGURE 1 are similar to those shown in FIGURE 3c, then the vector signal of vector $V_s$ minus the vector signal $I_1$ as measured in measuring means 16 will deliver an I' signal similar to $I_1'$ which is larger than $I_1$.

The means 16 will then deliver signal $I_1'$ to comparator 20 which also receives the signal $I_1$. Since the signal $I_1'$ is greater than the signal $I_1$ in comparator 20, a positive error signal having a magnitude which is functionally related to the difference in magnitudes between the two signals is delivered to some feed-back means schematically indicated by dotted line 22 to adjust the adjustable resistor 14 in such a manner that the output power of the circuit will be increased until the value of current times the cosine of the phase angle $p$ comes back to the initial value set by the standard voltage signal and the error signal will be brought back to zero.

If, on the other hand, the power in the circuit of FIGURE 1 is too high, as shown in FIGURE 3d, the output signal of system 16 will be less than the output signal of system 18, and system 20 will deliver a negative error signal which will adjust adjustable resistor 14 to decrease the power of the system until this negative error signal is brought to zero.

In the above description of the operation of the system of FIGURE 1, the system power was controlled to be maintained constant by the predetermined adjustment of the standard signal $V_s$. Clearly, the level at which the power is to be maintained is easily adjustable by adjusting the magnitude of signal $V_s$.

If it is desired to use our novel invention for power measurement or phase angle measurement, then the system of FIGURE 1 is simply modified whereby the compared output signals of I and I' may be adjusted by manual or automatic adjustment of the standard voltage signal until these current are equal. Since, as has been assumed, the voltage of the system is constant, the measure of magnitude of the standard voltage signal will be an indication of the value of the system current times the cosine of the phase angle when signals I and I' are equal, and from this, the power of the system may be easily computed, or could be impressed upon a properly calibrated indicator device.

Thus, in the system of FIGURE 2 the system vector current I is measured in system 24, while the standard signal vector $V_s$ is adjustably determined by means 26. These two signals are then delivered to subtracting circuit 16 which, as in the case of FIGURE 1, vectorially subtracts the vector system current I from the standard signal vector $V_s$ and yields the resultant vector I'. Circuit 16 then delivers vector I' to comparator 20 where it is compared with the circuit vector current I delivered from means 24 and, as in the case of FIGURE 1, comparator 20 delivers an error signal over a feed-back means schematically indicated by dotted line 28. In the case of FIGURE 2, however, the error signal is utilized to adjust the voltage standard signal $V_s$ until the circuit 20 delivers a zero error signal.

Clearly, this error signal is functionally related to the deviation of the particular value of the circuit current times the phase angle as compared to some pre-set value. In the same manner, the adjustment caused by the output of comparator 20 of the voltage signal $V_s$ is functionally related to the particular power of the circuit. Thus, a power condition indicator 30 may be driven from the voltage $V_s$ so as to give a direction indication of the power condition of interest in the circuit. If desired, the circuit current may also be measured and delivered to the indicator device 30 so that the indicator 30 receives signals which are functions of both the current times the cosine of the phase angle and the current alone, whereby the phase angle of the system or some function thereof may be directly displayed.

One specific circuit diagram of an embodiment of our invention wherein power is maintained constant is set forth in FIGURE 4. In FIGURE 4 an input voltage source of voltage V is connected to input terminals 32 and 34. A potentiometer 36 is connected across terminals 32 and 34, and the standard voltage signal $V_s$ is taken from a portion of potentiometer 36 between slider 38 and input terminal 34. The input voltage source is further connected in series with shunt resistor 40 and an inductive load comprising a resistive portion 42 and an inductive portion 44.

It is to be noted that while the embodiment set forth herein is discussed in conjunction with inductive loading, a capacitive or resistive load circuit could be used.

A first and second transformer 46 and 48 having primary windings 50 and 52 respectively are energized from the voltage drop across shunt resistor 40. The secondary windings 54 and 56 of transformers 46 and 48 respectively are then connected in circuit relation with potentiometer 36, as shown in the drawing. It is to be noted that the polarity of windings 50, 52, 54 and 56 is indicated by the heavy dot at the point where the winding starts.

Winding 56 is then connected in a closed series relation with a diode 58 and capacitor 60, while winding 54 is connected in closed series relation with respect to a diode 62 and capacitor 64 (having the same capacitance as capacitor 60), as shown in the figure.

A first and second resistor 66 and 68 or equal resistance are then connected directly in front of diodes 58 and 62 and form a center terminal 70 at their junction, while a meter 72 which may be of the null indicating type is connected across capacitors 60 and 64.

The power of the circuit of FIGURE 4 is then controlled by a power control means schematically shown by block 74 connected in series with the terminal 32, this power control means being of any desired type, and being operated from a servo mechanism system including the servo generator 76, amplifier 78, and servo motor 80. The servo generator 76 is actuated responsive to the signal applied to volt meter 72 in a manner to be described hereinafter.

The operation of the circuit of FIGURE 4 is as follows: the signal $V_s$, as has been previously described, is derived from potentiometer 36 and is of a constant magnitude, this following the assumption that the input voltage V to the terminals 32 and 34 is constant. The current signal I', seen in FIGURES 3b through 3d, is derived from secondary windings 54 and 56 of transformers 46 and 48.

That is, the secondary voltages appearing on windings 54 and 56 are functionally related to the circuit current flowing through shunt resistor 40. The voltage appearing across the secondary winding 54 is equal to the actual value of the current and is vectorially subtracted from voltage $V_s$ which is connected in series therewith and is equal to the required value of $2I \cos p$ to thereby deliver the I' signal between terminals 82 and 84. The voltage appearing on transformer secondary winding 56 is the vector signal I of FIGURES 3b through 3d, and this signal is impressed between terminals 82 and 86.

Thus, the capacitor 60 is charged to a unidirectional voltage through rectifier 58 which is proportional to the current signal I, while the capacitor 64 is charged through rectifier 62 to a voltage which is proportional to the I' signal. That is, the difference in magnitude between the signals I and I' is impressed across terminals 88 and 90. Clearly, this is the difference voltage which may be used as an error signal to control a power regulating device.

In FIGURE 4, this error signal is schematically shown as being delivered to a null type volt meter 72 to afford a visual observation of the power conditions of the circuit, but can also be delivered, as schematically indicated by dotted line 98 to the stator of a servo generator 76 which is energized from auxiliary means (not shown).

The reception of an error signal by servo generator 76 will cause a voltage difference between its stator and rotor, which voltage difference is delivered to amplifier 78 which initiates operation of servo motor 80. The motor 80 in turn is, as schematically indicated, connected to reposition the rotor of servo generator 76 as well as causing mechanical operation of a power controlling means 74.

This system more specifically operates so that the error signal delivered by servo generator 76 is decreased by motor 80 which, at the same time, adjusts controlling device 74 to cause the error signal to be driven back to a zero value.

Accordingly, the above described circuit may be used in maintaining a constant power output to the load comprised of resistive portion 42 and inductive portion 44.

If the circuit is to be used to measure the power output of the system, or some power condition of the system, then it is clear that the servo system would operate to adjust voltage $V_s$ by causing motor 80 to drive pointer 38 until the value of $V_s$ is found which will cause the error signal delivered across capacitors 60 and 64 to decrease to zero. The voltage $V_s$, in being functionally related to the power output of the system, may then cause an indicating device to indicate the system power. This measurement, however, may be easily obtained without the use of a servo system by the use of the meter 72 which may be used as a null indicating device. Thus, the voltage $V_s$ may be manually adjusted until the indicator device 72 reads zero.

Under this condition the measured value of $V_s$ will represent the component of $2I \cos p$ while the voltage between terminals 70 and 82 can be shown to represent $I \sin p$.

Accordingly, the values of $I \sin p$, $I \cos p$, the power of the circuit and the phase angle of the circuit may all be easily obtained from the system of FIGURE 4.

It is to be noted that the tan $p$ may also be obtained easily, since twice the voltage appearing across the terminals 70 and 82 divided by $V_s$ will equal this value.

Accordingly, our novel system of FIGURE 4 can be used as a device to measure power, power factor, vars, and various other functions or power conditions which include system current voltage and phase angle.

Although we have described preferred embodiments of our novel invention, many variations and modifications will now be obvious to those skilled in the art, and we prefer therefore to be limited not by the specific disclosure herein but only by the appended claims.

We claim:
1. A power measuring means for an electrical circuit; said power measuring means having a first means for delivering a standard signal functionally related to the circuit voltage and in phase therewith, and second means for delivering a second signal functionally related to the system current and in phase therewith; a subtracting means operatively connected to said first and said second means to receive said standard signal and said second signal; said subtracting means delivering a third signal functionally related to the vector difference of the quantities measured by said first and second means; a comparator means; said comparator means having said second and third signals impressed thereon; said comparator device delivering an error signal responsive to a difference in magnitude between said second and third signals; said error signal being operatively connected to power condition responsive means to operate said power condition responsive means.

2. A power measuring means for an electrical circuit; said power measuring means having a first means for delivering a constant standard signal functionally related to the circuit current and in phase therewith, and second means for delivering a second signal functionally related to the system voltage and in phase therewith; a subtracting means operatively connected to said first and said second means to receive said standard signal and said second signal; said subtracting means delivering a third signal functionally related to the vector difference of the quantities measured by said first and second means; a comparator means; said comparator means having said second and third signal impressed thereon; said comparator device delivering an error signal responsive to a difference in magnitude between said second and third signals; said error signal being operatively connected to power condition responsive means to operate said power condition responsive means; a power control means for adjusting the power of said circuit to a value determined by said constant standard signal means; said power control means maintaining constant power by keeping said error signal at zero.

3. A power measuring means for an electrical circuit; said power measuring means having a first means for delivering a constant standard signal functionally related to the circuit voltage and in phase therewith, and second means for delivering a second signal functionally related to the system current and in phase therewith; a subtracting means operatively connected to said first and said second means to receive said standard signal and said second signal; said subtracting means delivering a third signal functionally related to the vector difference of the quantities measured by said first and second means; a comparator means; said comparator means having said second and third signal impressed thereon; said comparator device delivering an error signal responsive to a difference in magnitude between said second and third signals; said error signal being operatively connected to power condition responsive means to operate said power condition responsive means; a power control means for adjusting the power of said circuit to a value determined by said constant standard signal means; said power control means maintaining constant power by keeping said error signal at zero; said error signal being connected to said power control means through servo system means to automatically maintain said error signal at zero and said system power constant.

4. A power measuring means for an electrical circuit; said power measuring means having a first means for delivering a constant standard signal functionally related to the circuit current and in phase therewith, and second means for delivering a second signal functionally related to the system voltage and in phase therewith; a subtracting means operatively connected to said first and said second means to receive said standard signal and said second signal; said subtracting means delivering a third signal functionally related to the vector difference of the quantities measured by said first and second means; a comparator means; said comparator means having said second and third signal impressed thereon; said comparator device delivering an error signal responsive to a difference in magnitude between said second and third signals; said error signal being operatively connected to power condition responsive means to operate said power condition responsive means; power condition indicating means operable as a function of the magnitude of said standard signal; said first means for delivering said standard signal being adjustable; said standard signal driving said power condition indicating means to indicate a circuit power condition when said standard signal is adjusted to bring said error signal to zero.

5. A power measuring means for an electrical circuit; said power measuring means having a first means for delivering a constant standard signal functionally related to the circuit voltage and in phase therewith, and second means for delivering a second signal functionally related to the system current and in phase therewith; a subtracting means operatively connected to said first and said second means to receive said standard signal and said second signal; said subtracting means delivering a third signal functionally related to the vector difference of the quantities measured by said first and second means; a comparator means; said comparator means having said second and third signal impressed thereon; said comparator device delivering an error signal responsive to a difference in magnitude between said second and third signals; said error signal being operatively connected to power condition responsive means to operate said power condition responsive means; power condition indicating means operable as a function of the magnitude of said standard signal; said first means for delivering said standard signal being adjustable; said standard signal driving said power condition indicating means to indicate a circuit power condition when said standard signal is adjusted to bring said error signal to zero; said error signal being connected to said first means through servo system means to maintain said error signal to zero and cause said power condition indicating means to be continuously driven.

References Cited in the file of this patent
UNITED STATES PATENTS

| | | |
|---|---|---|
| 2,700,748 | Britton et al. | Jan. 25, 1955 |
| 2,830,256 | Bale | Apr. 8, 1958 |